United States Patent [19]

Grant et al.

[11] Patent Number: 4,874,014

[45] Date of Patent: Oct. 17, 1989

[54] FLOW CONTROL MANIFOLD

[75] Inventors: Robert W. Grant; William M. Jenson, both of Excelsior, Minn.

[73] Assignee: FSI International, Inc., Chaska, Minn.

[21] Appl. No.: 135,939

[22] Filed: Dec. 21, 1987

[51] Int. Cl.⁴ ............................................. F16K 11/22
[52] U.S. Cl. .................................... 137/606; 137/884; 251/63.5; 251/335.3
[58] Field of Search ........................ 137/606, 884, 607; 251/63.5, 335.3, 122, 367, 368; 411/910, 437

[56] References Cited

U.S. PATENT DOCUMENTS

| | | | |
|---|---|---|---|
| 3,298,272 | 1/1967 | Henderson | 411/910 X |
| 3,572,366 | 3/1971 | Wiggins | 137/606 X |
| 3,819,149 | 6/1974 | Kinder | 251/368 X |
| 3,982,559 | 9/1976 | Ochs | 251/368 X |
| 4,231,392 | 11/1980 | Allibert | 137/606 X |
| 4,306,587 | 12/1981 | Tchebinyayeff | 137/606 |
| 4,359,204 | 11/1982 | Williams | 251/335.3 X |
| 4,460,300 | 7/1984 | Bettini et al. | 411/910 X |
| 4,474,356 | 10/1984 | Baumann | 251/122 |

FOREIGN PATENT DOCUMENTS 2452945  5/1975  Fed. Rep. of Germany ...... 137/884

Primary Examiner—Stephen Hepperle
Attorney, Agent, or Firm—Faegre & Benson

[57] ABSTRACT

A fluid dispensing and metering unit is described for dispensing fluids into a system without the introduction of microcontaminants into the fluid flow. This unit includes a block with a fluid conducting duct axially extending from the block's proximal face to the block's distal face. In communication with the fluid conducting duct is a combined dispensing and modulating means for regulating the amount of fluid entering the fluid conducting duct. A plurality of these units can be assembled to construct a flow control manifold, creating a single continuous duct for carrying all dispensed fluids.

14 Claims, 2 Drawing Sheets

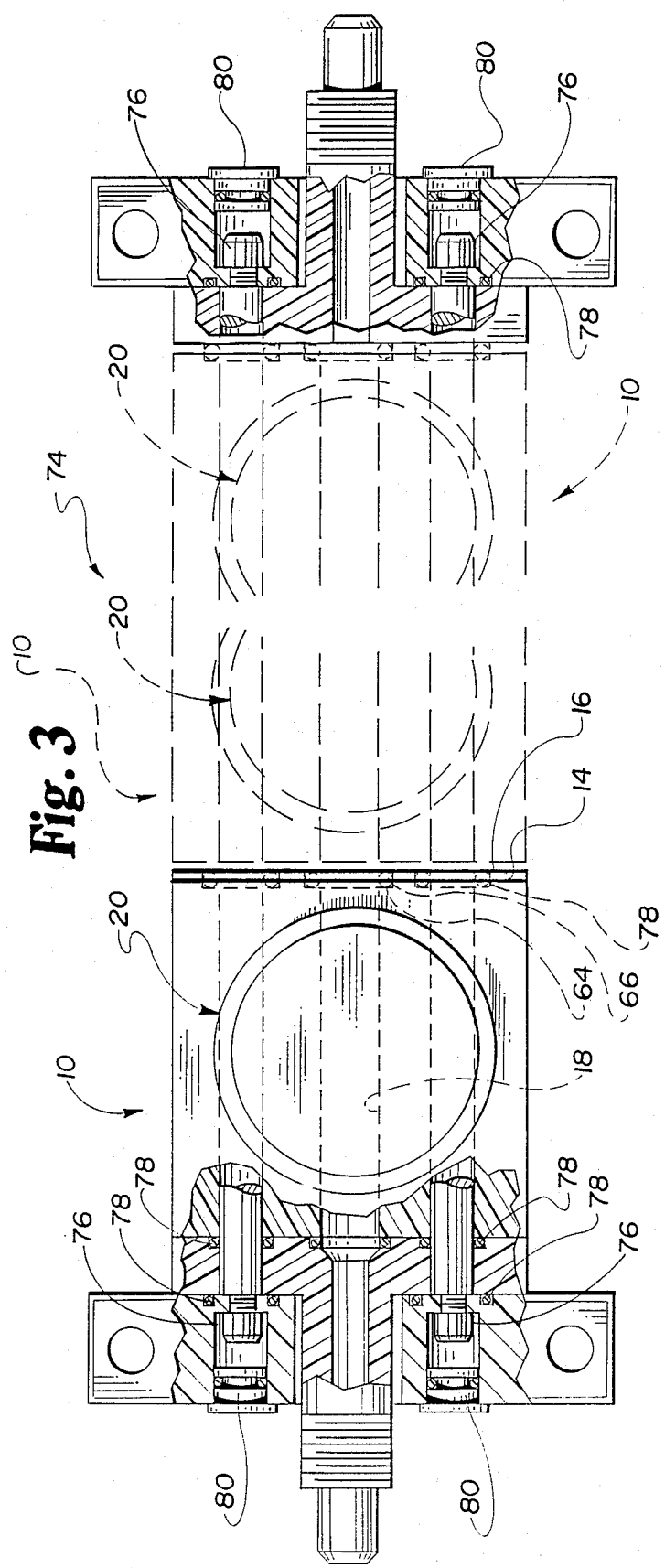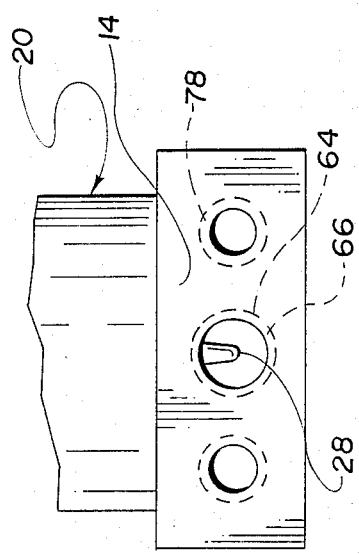

FLOW CONTROL MANIFOLD

BACKGROUND OF THE INVENTION

This invention concerns the introduction of fluids into a system without microcontaminants entering the fluid flow. More particularly, the invention relates to a fluid dispensing and metering unit which can be combined with other similar units to create a flow control manifold. The flow control manifold provides for the addition of a variety of different fluids into a single, clean continuous duct.

In the course of manufacturing wafers for integrated circuits, the wafers are rinsed with various chemicals and deionized water for coating, etching and cleaning processes. It is of the utmost importance that these fluids are applied to the wafers in a very clean state, absent contaminants that may reside in the fluid conducting system. Possible contaminants include residual fluids that previously passed through the system and microscopic particles of grease, dust and metallic particles generated from individual pieces of the fluid conducting system rubbing against each other. If such contaminants are inadvertently sprayed onto the wafers, the potential utilization of the wafer for the construction of an integrated circuit may be significantly decreased. For example, the presence of residual fluids could chemically effect subsequent processing steps of the wafer.

To prevent even microscopic particles from entering the fluid flow, thorough rinsing of the fluid delivery system must be performed between processing steps. The optimum means for conducting such a thorough rinsing would have a minimum surface area and would eliminate areas in which particle accumulation is likely. For example, previous fluid delivery systems have included threaded connection surfaces. The hollow between each individual thread can hold minute amounts of contaminants. Complete rinsing of each hollow is a very difficult task. Other prior assemblies have used numerous strands of tubing to deliver each particular fluid into the delivery system. Such a system generally has more joints and surfaces for contaminants to reside, making flushing of the system less thorough and more time consuming.

SUMMARY OF THE INVENTION

We have now developed a device having a generally small surface area for rinsing which supplies a very clean fluid flow for the manufacture of wafers. At the same time, the unit both precisely meters and dispenses the various fluids.

Briefly, the invention first consists of a single fluid dispensing and metering unit. This unit is generally a block having a proximal and distal face. A fluid conducting duct runs through the block from the proximal to the distal face. Located generally above this duct is the dispensing portion of the invention. An aperture in the fluid conducting duct communicates with this dispensing portion.

A very flexible bellows is mounted on the block to create a fluid tight cavity between the block and the bellows. The bellows has a tip which lies in the aperture and extends into the fluid conducting duct. The chosen fluid travels through a fluid port into this fluid-tight cavity. A housing having a hollow cavity is mounted above the bellows to form a chamber between the housing and the bellows. A passageway exists between the hollow cavity and the bellows chamber. Springably mounted in the hollow cavity is a piston. The piston extends through the housing passageway into the bellows chamber where it threadably engages the bellows.

When the piston is retracted, the bellows is drawn toward the housing, removing the bellows tip from the aperture. Withdrawal of the bellows tip allows fluids residing in the fluid cavity to pass into the fluid conducting duct. Piston retraction can be affected by air pressure working on the spring holding the piston. Controlling the timing and amount of air pressure is a means to meter the amount of fluid dispensed.

A second feature of the invention involves aligning a plurality of these fluid dispensing units so that a single continuous fluid duct is obtained. In this way, various fluids for processing the wafers can be dispensed into a single duct. Utilization of a single fluid duct minimizes the surface area of the fluid delivery system to be rinsed. The particular structure of this invention also maximizes the thoroughness of the rinsing process to ensure a cleaner fluid flow. Other advantages of the invention will become apparent to those skilled in the art from the following detailed description of the preferred embodiment when considered in conjunction with the accompanying drawings.

BRIEF DESCRIPTION OF THE DRAWINGS

FIG. 3 is a top plan view of the individual units of the invention aligned to form a single continuous duct shown shortened on the longitudinal axis; and FIG. 4 is a front elevational view of the unit taken along line 4—4 in FIG. 1.

DETAILED DESCRIPTION OF THE PREFERRED EMBODIMENT

Figure 1:
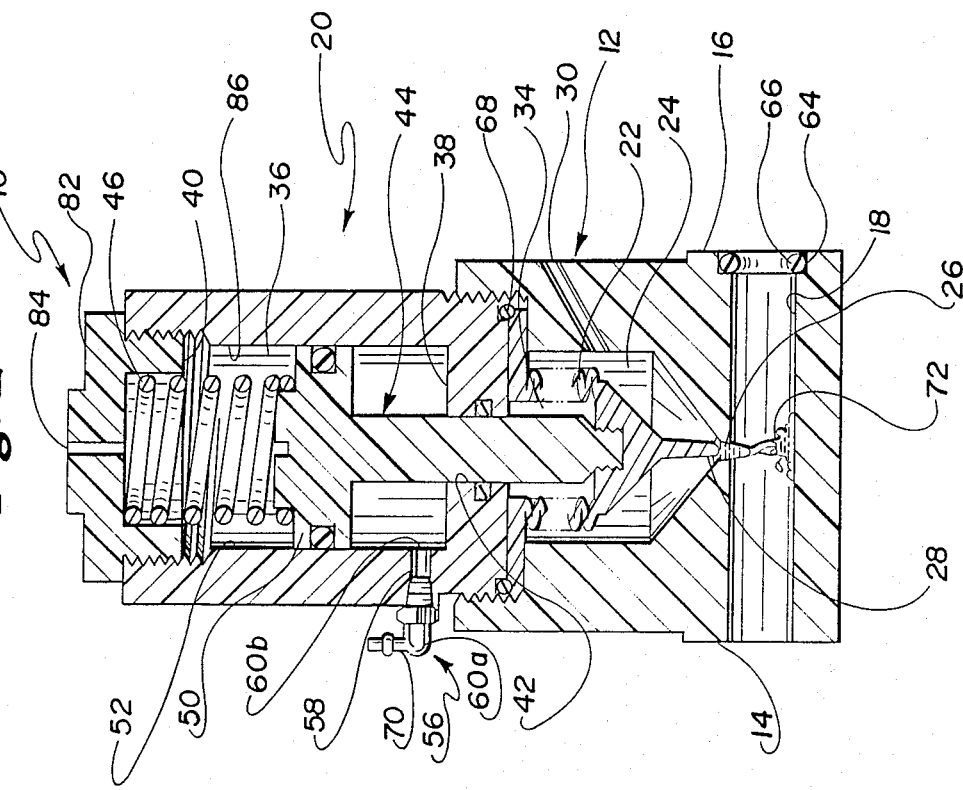
FIG. 1 is a sectional side elevation of the fluid dispensing and metering unit of the present invention in the closed position.

Referring now to the drawings, FIG. 1 shows a sectional side elevation of a single fluid dispensing and metering unit, referred to generally as 10. The unit generally consists of a block 12 having a proximal face 14 and a distal face 16. A fluid conducting duct 18 extends from the proximal face 14 to the distal face 16 communicating with the area external to the block at both faces. Suitable materials for the block composition include synthetic resins that are heat, chemical and pressure resistant. The block is preferably constructed of PTFE. Alternatively, PVDF and PFA may be used. PTFE is a common and well known acronym for polytetrafluorethylene. PVDF is a common and well known acronym for polyvinylidenefluoride. PFA is a common and well known acronym for penfluoroalkoxy. To dispense the desired fluid into the duct 18, a dispensing means, generally shown as 20, is connected to the block 12. The dispensing means 20 extends into the fluid conducting duct 18 and is located generally intermediate to the proximal block face 14 and the distal block face 16.

In the preferred embodiment the dispensing means 20 has a flexible bellows 22 mounted on the block 12 to create a fluid-tight cavity 24. An O-ring 68 lying between the bellows 22 and the block 12 is used to enhance the fluid-tight seal. The bellows 22 is preferably constructed of PTFE for flexibility. Other suitable materials include PFA. The created fluid-tight cavity has an aperture 26 leading into the fluid conducting duct 18.

When the unit of the present invention is in the closed position as shown in FIG. 1, a tip portion 28 of the bellows 22 sealingly engages the aperture 26 as it extends into the fluid conducting duct 18. The fluid to be dispensed enters the fluid-tight cavity 24 through a fluid port 30. The fluid port externally engages a fluid source. When the bellows tip portion 28 engages the aperture 26, the fluid entering the fluid-tight cavity 24 cannot enter the fluid conducting duct 18.

Mounted above the bellows 22 is a housing 32. This configuration creates a sealed chamber 34 between the housing 32 and the bellows 22. The housing 32 has a hollow cavity 36 with a proximal cavity end 38, a distal cavity end 40 and interior walls 86. Preferably, the distal end 40 includes a housing cap 82 having a vent 84 that threadably engages the body of the housing 32. A passageway 42 exists between the hollow cavity 36 and the bellows chamber 34. Springably mounted on the distal end 40 of the hollow cavity 36, by a rate spring 46, is a piston 44. The piston 44 has a longitudinal shaft 48 held in a fluid-tight relation within the housing passageway 42 and partially extending into the bellows chamber 34 to threadably engage the bellows 22. A larger diameter portion 50 of the piston 44 abuts the interior walls 86 of the hollow cavity 36, dividing the hollow cavity 36 into an upper 52 and lower 54 hollow cavity portion. A fluid-tight seal exists where the larger diameter piston portion 50 engages the hollow cavity 36 of the housing 32. Preferably, the piston is made of PVC.

The unit is also provided with a modulating means, generally referred to as 56. This modulating means precisely meters the amount of fluid that is dispensed into the fluid conducting duct 18. In the preferred embodiment the modulating means 56 includes a metering passageway 58 having a proximal 60a and a distal 60b end. The metering passageway 58 extends from outside the housing 32 to the lower hollow cavity portion 54. The proximal end 60a is adapted for receiving a fluid flow source, such as an end of tubing. Preferred fittings include nozzles and barbs. FIG. 1 shows a barb 70 as a preferred adaption.

Figure 2:
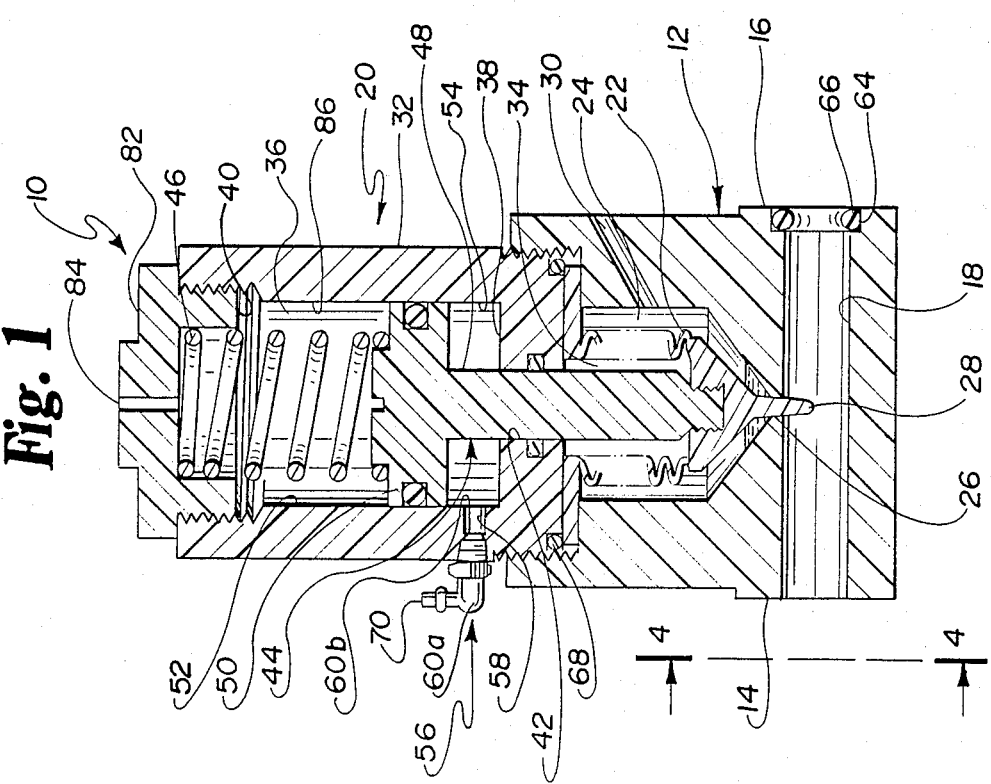
FIG. 2 is a the view of FIG. 1 in the open position.

FIG. 2 depicts the fluid dispensing unit of the present invention in the open position. This position is obtained by forcing a fluid through the metering passageway 58 of the modulating means 56. The preferred fluid is air, but other fluids such as water are also possible. The fluid enters into the lower portion 54 of the hollow cavity 36 from the metering passageway 58 to force the piston 44 toward the distal end 40 of the hollow cavity 36. Retraction of the piston 44 in this manner, draws the bellows 22 toward the housing 30 removing the bellows tip portion 28 from the aperture 26. Fluid 72 can now pass from the previously fluid-tight cavity 24 into the fluid conducting duct 18.

Reversing the pressure on the metering passageway 58 withdraws the fluid from the lower portion 54 of the hollow cavity 36. In response, the piston 44 moves toward the proximal cavity end 38. The bellows 22 returns to a relaxed position with the bellows tip portion 28 again engaging the aperture 26. This is the closed position of FIG. 1 preventing the flow of fluids into the fluid conducting duct. By controlling the amount of pressurized fluid entering the metering passageway and the length of time the piston is retracted, one can regulate the amount of fluid to dispense into the fluid conducting duct.

FIG. 3 illustrates the flow control manifold of the present invention, generally referred to as 74. The flow control manifold 74 consists of a plurality of fluid dispensing units 10 aligned so that the individual fluid conducting ducts 18 of each fluid dispensing unit 10 forms a single continuous duct 62. The units 10 are in sealing engagement with the distal face 16 of each unit 10 engaging the proximal face 14 of the neighboring unit 10. As shown in FIG. 3, the units are joined by two tie bolts 76 which penetrate the series of blocks. These bolts are protected from any corrosive action of the dispensed fluids by means of 0-rings 78 and protective end caps 80.

FIG. 3 also shows that a fluid-tight seal preferably exists where the individual fluid conducting ducts 18 meet to form the single duct 62. Referring back to FIG. 1, in the preferred embodiment the seal is created by a recess 64 in the distal block face 16 of a larger diameter than and coaxial with the fluid conducting duct 18. An 0-ring 66 sits in this recess 64. When the distal block face 16 of the first unit engages the proximal block face of a second unit, this construction creates a fluid-tight seal around the connection between the fluid conducting ducts 18.

FIG. 4 shows the flow control manifold of FIG. 1 through line 4-4. Of particular interest is the intrusive nature of the 0-ring 66 and the bellows tip portion 28 into the fluid conducting duct 18. Such an intrusion is desirable because positive features are easier to rinse of contaminants than negative features.

While a specific embodiment of the invention has been shown and described in detail to illustrate the application of the inventive principles, it will be understood to those skilled in the art that the invention may be embodied otherwise without departing from such principles.

What is claimed is:

1. A fluid dispensing and metering unit for dispensing a desired fluid amount into a fluid conducting duct, comprising:
   (a) a block having a proximal and distal face, and a fluid conducting duct axially extending from said proximal face through said block to said distal face;
   (b) means in communication with said fluid conducting duct of said block for dispensing fluid into said duct, said dispensing means intersecting said fluid conducting duct generally intermediate to said proximal block face and said distal block face, said dispensing means comprising:
      (1) a flexible bellows mounted in said block creating a fluid tight cavity between said block and said bellows, said cavity having an aperture leading into said fluid conducting duct, said bellows having a tip sealingly engaging said aperture and extending into said duct;
      (2) a fluid port, said port extending from outside of the said block into said fluid-tight cavity;
      (3) a housing mounted on said bellows forming a chamber between said housing and said bellows, said housing having a hollow housing cavity with a proximal distal end, and a passageway from said proximal end of the hollow cavity to said bellows chamber; and
      (4) a piston springable mounted on said distal end of said hollow cavity of said housing, said piston having a longitudinal shaft held in a fluid-tight relation within said housing passageway and extending into said bellows chamber to threadably engage said bellows, and said piston having a larger diameter portion in fluid-tight relation with said housing, said larger diameter portion dividing the hollow housing cavity into an upper and lower portion;

whereby retraction of the piston toward the distal end of the hollow housing cavity draws the bellows towards the housing thereby removing the bellows tip from the aperture and allowing fluids from the fluid port now residing in the fluid cavity to pass through the aperture of the cavity into the fluid conducting duct; and (c) means connected to said dispensing means for modulating the dispensing of the fluid, said modulating means using a pressurized fluid to interact with the dispensing means for controlling the amount of fluid entering the fluid conducting duct.

2. The fluid dispensing unit of claim 1, wherein said modulating means comprises a metering passageway with a proximal end and a distal end, said proximal end adapted for receiving a fluid flow source, said passageway extending from outside the housing into the lower portion of said hollow cavity such that fluid conducted through said passageway and entering into said lower portion forces a piston towards the distal end of said hollow cavity.

3. The fluid dispensing unit of claim 2, wherein said fluid traveling through said metering passageway is air.

4. The fluid dispensing unit of claim 1, wherein said block is made of PTFE.

5. The fluid dispensing unit of claim 1, wherein said block is made of heat, chemical and pressure resistant synthetic resin.

6. The fluid dispensing unit of claim 1, further comprising a rate spring mounted on said distal cavity end and connected to said larger diameter portion of said piston.

7. A flow control manifold for the metering and dispensing of a plurality of fluids into a single continuous duct, comprising:

(A) a plurality of fluid dispensing units, each said fluid dispensing unit having
    (1) a block with a proximal and distal face and a fluid conducting duct extending from said proximal face through said distal face;
    (2) means in communication with said fluid conducting duct of said block for dispensing fluid into said duct, said dispensing means intersecting said fluid conducting duct generally intermediate to said proximal block face and said distal block face;
    (3) means connected to said dispensing means for modulating the dispensing of the fluid, said modulating means using a pressurized fluid to interact with the dispensing means for controlling the amount of fluid entering the fluid conducting duct; and
  (B) the distal face of each fluid dispensing block in sealing engagement with the proximal face of another fluid dispensing block such that the fluid conducting ducts of said fluid dispensing units generally form a single continuous duct;

wherein said dispensing means further comprises:
  (a) a flexible bellows mounted in said block such that a fluid tight cavity is created between said block and said bellows, said cavity having an aperture leading into said fluid conducting duct, said bellows having a tip sealingly engaging said aperture and extending into said duct;
  (b) a fluid port, said port extending from outside of said block into said fluid-tight cavity;
  (c) a housing mounted on said bellows to form a chamber between said housing and said bellows, said housing having a hollow housing cavity with a proximal and distal end, and a passageway from said proximal end of the hollow cavity to said bellows chamber; and
  (d) a piston springably mounted on said distal end of said hollow cavity of said housing, said piston having a longitudinal shaft held in fluid-tight relation within said housing passageway and extending into said bellows chamber to threadably engage said bellows, and said piston having a larger diameter portion in fluid-tight relation with said housing, said larger diameter portion dividing the hollow housing cavity into an upper and lower portion;

whereby retraction of the piston toward the distal end of the hollow housing cavity draws the bellows towards the housing thereby removing the bellows tip from the aperture and allowing fluids from the fluid port now residing in the fluid cavity to pass through the aperture of the cavity into the fluid conducting duct.

8. The flow control manifold of claim 7, wherein said fluid dispensing units are made of PTFE.

9. The flow control manifold of claim 7, wherein said fluid dispensing units are made of a heat, chemical and pressure resistant synthetic resin.

10. The flow control manifold of claim 7, further comprising a fluid-tight seal between the fluid conducting ducts of said fluid dispensing blocks for forming a single continuous duct.

11. The flow control manifold of claim 10, wherein said fluid-tight seal comprises:
  a recess on said distal face of said block of larger diameter than and coaxial with the distal end of the fluid conducting duct, and an O-ring lying in said recess and partially extending into the continuous duct.

12. The flow control manifold of claim 7, wherein said modulating means comprises a metering passageway with a proximal end adapted for receiving a fluid flow source, said passageway extending from outside the housing into the lower portion of said hollow cavity such that fluid conducted through said passageway and entering into said lower portion forces a piston towards the distal end of said hollow cavity.

13. The flow control manifold of claim 7, wherein said fluid dispensing units are joined together by bolts.

14. The flow control manifold of claim 13, wherein said bolts are protected from corrosion by end caps.

* * * * *